United States Patent

Thorud et al.

[11] 3,982,082
[45] Sept. 21, 1976

[54] STARTING SYSTEM

[75] Inventors: Richard A. Thorud, Bloomington; William D. Wood, Minneapolis; Derald D. Ramsey, Richfield, all of Minn.

[73] Assignee: The Toro Company, Minneapolis, Minn.

[22] Filed: Aug. 4, 1975

[21] Appl. No.: 601,345

[52] U.S. Cl................................. 200/44; 56/16.7; 200/157
[51] Int. Cl.²........................................ A01D 35/24
[58] Field of Search.................. 200/44, 42 R, 42 T, 200/157; 56/16.7, 26, 10.5, 25.4

[56] References Cited
UNITED STATES PATENTS
3,603,065   9/1971   Weber ............................... 200/157

Primary Examiner—Herman Hohauser
Attorney, Agent, or Firm—Merchant, Gould, Smith, Edell, Welter & Schmidt

[57] ABSTRACT

In a lawn and garden implement, a starting system is provided therefor which prevents accidental energization of the implement, and which also provides for automatic deenergization of the implement upon release thereof by the operator. The starting system includes an actuator lever engaging a switch actuator to rotate a removable key inserted within a rotary operated switch to open and close the implement's circuitry. Lockout means are provided which engage the switch actuator and which must be disengaged therefrom to permit actuator rotation. The component parts of the present invention all cooperate sequentially to provide a starting system which will not energize the implement unless the operator consciously follows the proper starting sequence.

13 Claims, 8 Drawing Figures

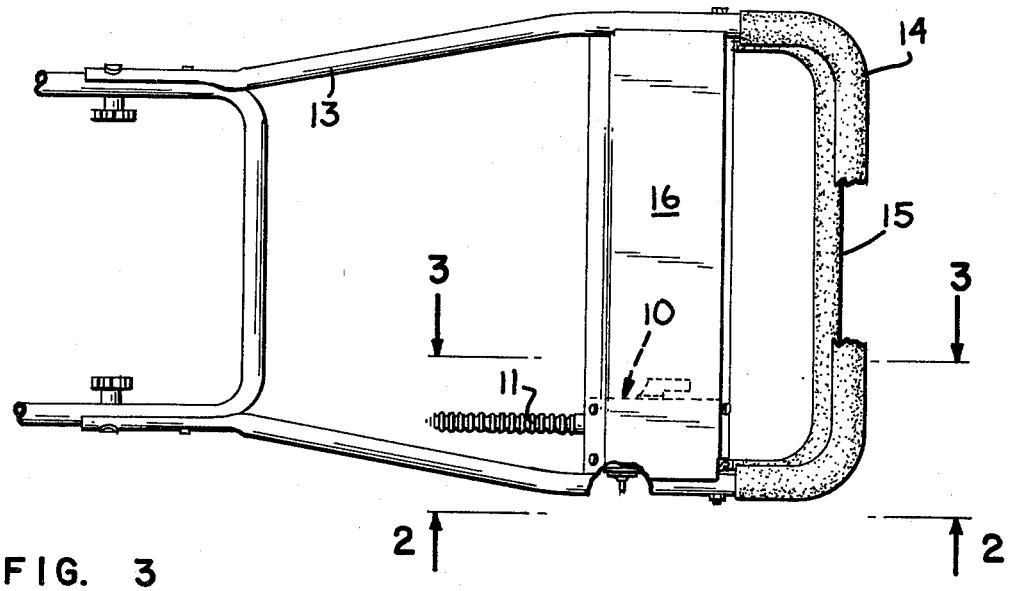
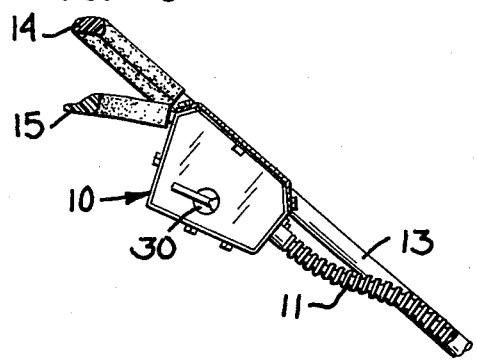
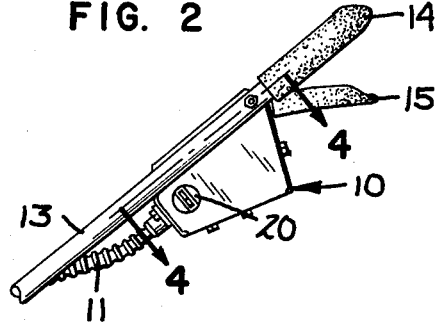
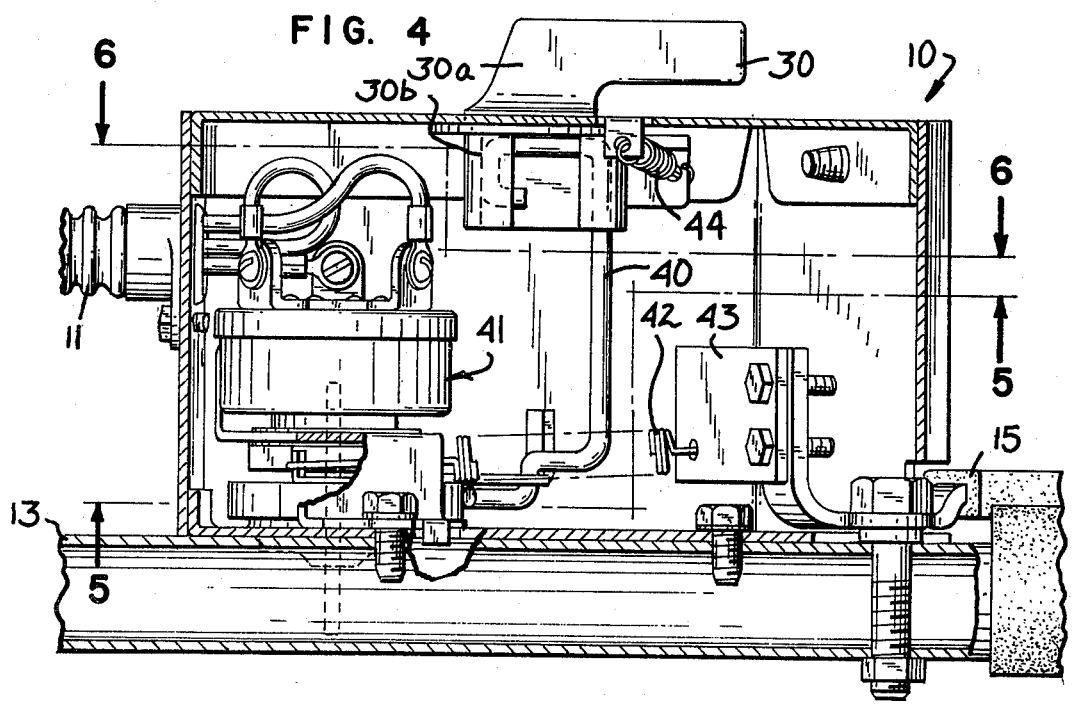

3,982,082

STARTING SYSTEM

BACKGROUND OF THE INVENTION

1. Field Of Invention

The present invention generally concerns an implement starting system and more specifically concerns a sequential starting system for use on electrically powered lawn and garden implements.

2. Prior Art

Lawn and garden implements, such as lawnmowers, which are self-propelled or which include an otherwise integrated power plant are generally powered by small internal combustion engines or electrical motors. The implements are energized by action of an operator and generally continue to run until the operator acts to stop the implement. Various systems have been designed and developed to prevent accidental or inadvertent energization of the implement. Some of these systems also includes features which will automatically stop the implement when the operator relinquishes control or otherwise leaves a normal control position at the implement.

The salient features of the various systems have included such items as dead man controls and interlock starting systems. Dead man controls generally serve to de-energize the system when the operator releases, for any reason, the handle or trigger which controls energization of the lawnmower. Interlock systems, on the other hand, are provided to prevent accidental energization of the mower by requiring certain affirmative acts by the operator before the mower can be started.

Representative examples of starting systems can be found in U.S. Pat. Nos. 3,603,065, issued to Weber on Sept. 7, 1971, and 3,230,695, issued to West on Jan. 25, 1966. Weber, 3,603,065, describes a reel-type mower having a cam safe switch actuator system for selectively preventing actuation of the switch and energization of the system. In West, 3,230,695, a lawnmower is described which includes a dead man type handle and a dual switch starting mechanism.

The present invention is an improvement in such lawnmower starting systems.

SUMMARY OF THE INVENTION

The present invention concerns a starting system for lawn and garden implements such as lawnmowers. The embodiments described in detail herein are directed to a battery powered lawnmower starting system, but may readily be adaptable to other types of lawn and garden implements.

A mechanical actuator lever, which is responsive to operator control and movable between two positions, is mounted on the lawnmower handle assembly. The mechanical actuator lever is operably engaged with a switch actuator such that the switch actuator is rotational in response to movement of the lever actuator. The switch actuator rotates between two positions in response thereto. The starting system further includes an electrical switch means which is actuated by rotational movement of a portion of the switch between two positions which serves to open and close the starting circuit of the implement. The switch actuator and the switch are operably engageable by a removable key means. Finally, a lock out means is provided which is selectively engageable and disengable with the switch actuator. When the lock out means is engaged with the switch actuator it serves to prevent rotation thereof and subsequent closing of the switch.

BRIEF DESCRIPTION OF THE DRAWINGS

FIG. 1 is a view in top plan of a lawn and garden implement assembly indicating a preferred placement of an embodiment of the present invention thereon;

FIG. 2 is a view in side elevation thereof as seen from a line 2—2 of FIG. 1;

FIG. 3 is a sectional view as seen from a line 3—3 of FIG. 1;

FIG. 4 is a sectional view as seen from a line 4—4 of FIG. 2;

DETAILED DESCRIPTION OF THE DRAWINGS

Figure 5:
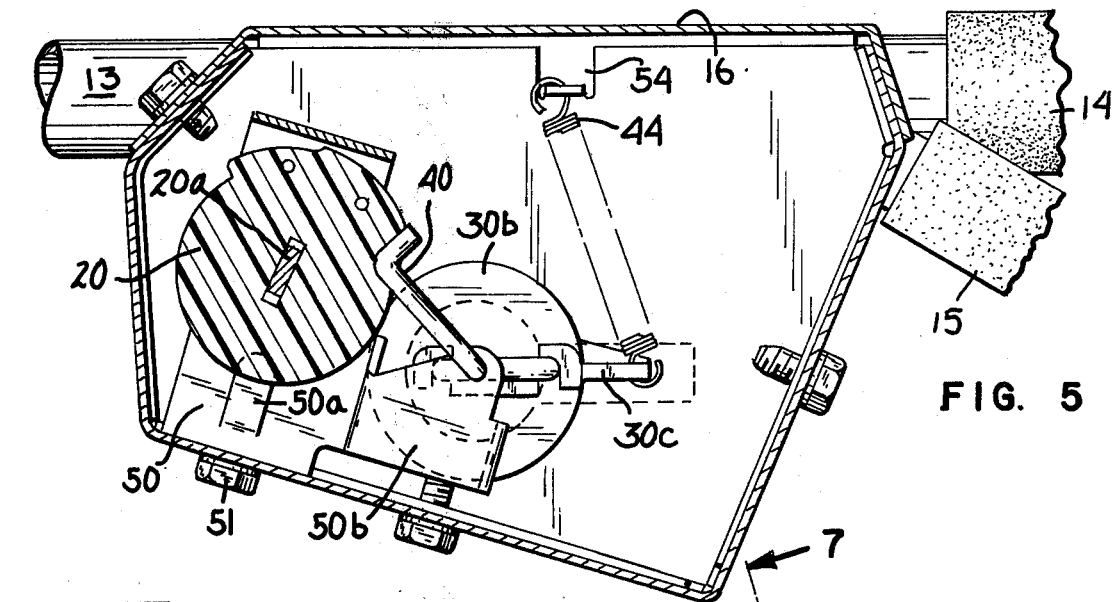
FIG. 5 is a sectional view as seen generally along a line 5—5 of FIG. 4.
Figure 6:
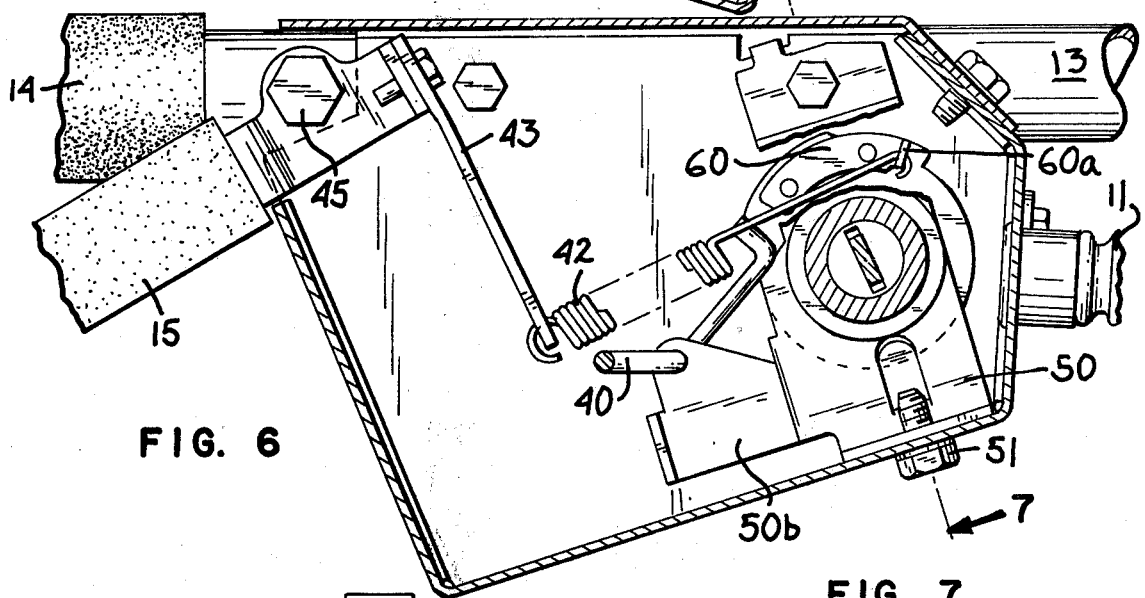
FIG. 6 is a sectional view seen generally along a line 6—6 of FIG. 4.

While the present invention is not so limited, the specific embodiments of the lawn and garden implement starting system of the present invention described in detail herein are for use on electrically operable mowers. Further, the present invention describes adaptation to a cordless mower utilizing a rechargeable battery system, but could as well be employed by electric mower using a cord-type connection to conventional AC power.

Referring now generally to FIG. 1, there is shown a lawn mower handle assembly having a lower handle assembly 12, portions thereof being cut away, lower handle assembly 12 is adjustably secured to an upper handle assembly 13 by means of a pair of threaded knobs. Upper assembly 13 includes a handgrip portion 14 which has a non-conductive sleeve grip thereon being formed of any suitable non-conductive material such as rubber or plastic.

Means defining a mechanical actuator responsive to operator control, which in the present embodiment is a lower lever 13 mounted by bolts 45 and is pivotal thereon between a first and a second position. Actuator lever 15 corresponds generally in size and shape to the upper hand grip portion 14. A nonconductive sleeve grip similar to that on upper handle 14 is also included on lever actuator 15. The lower actuator lever 15, as described in this embodiment, is weighted so that when released, gravitational forces return it to the first position as shown generally in FIG. 3 or FIG. 4. However, lever actuator 15 could also be spring biased in its first position and alternative means responsive to operator control might be used.

A switch housing 10, is bolted to and carried by upper assembly 13. Switch housing 10 is positioned on one side of upper handle assembly 13 near the juncture of actuator lever 15 and the upper handle 14. The location of switch housing 10 is not in anyway critical. It could be positioned anywhere which would provide convenient access for the operator in a control position on the implement.

A face plate 16, which extends across the upper portion of handle assembly 13, and which is bolted thereto, forms a cover for switch housing 10, face plate 16 is also bolted to housing 10.

Switch housing 10 includes several component parts therein. Switch means, which may be an electrical switch 41, is situated within switch housing 10 and carried by a switch mounting plate 50. Mounting plate 50 is bolted by means of bolt 51a to the bottom of switch housing 10 and is also bolted by means of bolt 51b the upper portion thereof to housing 10 and to upper handle assembly 13. Switch 41 includes an extension portion thereon which projects through a mid-central hole in switch mounting plate 50 and which is threadably engaged by a nut 71 on the opposite side of mounting plate 50. A lock washer 72 and a spacer washer 73 are provided around the extension portion of switch 41 on either side of the mounting plate 5 to help retain switch 41 on mounting plate 50. The extension portion of switch 41 includes a keyed slot therein to provide mechanical access to the interior of switch 41 (not shown) and may be actuated by rotation of a key inserted into the keyed slot. In the preferred embodiment shown, switch 41 may be internally spring biased toward an open or nonenergized condition.

A key switch actuator 20, which is aligned with switch 41, is positioned between mounting plate 50 and the interior wall of housing 10. Switch actuator 20 has a generally cylindrical portion thereof which projects through a hole in the side of housing 10. A circumferential flange portion on switch actuator 21, which has a diameter greater than that of the hole in the side of housing 10, keeps the switch actuator 20 from passing through the hole in housing 10 and has a surface which bears against housing 10. Switch actuator 20 is held in position by mounting plate 50. A retainer ear 50a projects outwardly from mounting plate 50 and engages switch actuator 21 to bias switch actuator 20 with the flange portions thereof in contact with the housing 10. Switch actuator 20 is free to rotate in this position, being neither bolted or otherwise affixed to housing 10 or mounting plate 50. Similar to switch 41, switch actuator 20 includes an elongated key slot therein extending completely through the body thereof and aligned with the keyed slot in the extension portion of switch 41. When key 70 or other mechanical linking means is inserted through the elongated slot of switch actuator 20 and into switch 41, a mechanical connection is thereby made to provide for transfer of the rotational movement of the switch actuator 20 to actuate switch 41.

In the embodiment shown, rotation of switch actuator 20 is effected by operation of actuator lever 15.

Actuator lever 15, as shown in FIG. 4 includes an inwardly directed bracket portion at one end thereof extending into housing 10. A downwardly extending lever plate 43 is bolted to the bracket portion. Lever plate 43 includes an aperture in the lower portion thereof, which aperture receives one end of a lever spring 42. The opposite end of spring 42 extends to connect with switch actuator 20. A spring keeper 60, having a spring eye 60a thereon which engages the spring 42, is attached by riveting or any other suitable means to switch actuator 20 at the periphery of actuator 20. The cooperation of actuator lever 15 and switch actuator 20 is such that when actuator lever 15 is pivoted to its second position, for example, by operator pressure on the handle, spring 42 will cause switch actuator 20 to rotate, or pivot, within housing 10. When key 70 is inserted, the rotation of switch actuator 20 will be transferred to switch 41, which will in turn energize or deenergize an electric motor on the implement.

On the opposite side of housing 10 there are lockout means which in the embodiment shown includes a lockout lever 30, shown generally in FIG. 4. Lockout lever 30 includes a handle portion 30a thereof exterior to housing 10 fastened to bracket portion 30b located within housing 10. Lockout lever 30 is rotatably carried by housing 10, and rotatably between first and second positions discussed below. Lever 30 is spring-biased towards a first position by a lockout lever spring 44. Bracket portion 30b includes a spring arm extension 30c which has an eyehole therein engaging one end of spring 44. The opposite end of spring 44 is fastened to a spring catch ear 54 located on housing 10 above lever 30. Thus, the lockout lever 30 may be rotated against the bias of spring 44, and upon release, will return to a first position.

Lockout lever 30 protects against accidental energization of the implement by preventing actuation of switch 41 when in its first position. A substantially rigid stop member 40 which may be a formed, relatively rigid wire stop, is inserted into bracket portion 30b of lockout lever 30 and rotates with the lockout lever. Stop member 40 has an elongated portion extending inwardly from the bracket portion 30b, a rearwardly projecting portion 50b of mounting plate 50. Stop member 40 has an end opposite the end held by bracket 30b which extends through a bearing hole in rearward projection 50b and is restrained against lateral movement by a pair of successive bends in the stop member 40 on both sides of rearward projection 50b. Following these bends, stop member 40 extends generally upward and perpendicular to the axis of rotation defined by lever 30 and the bearing hole, and terminates at a cam portion thereof. The cam portion of wire stop member 40 is releasably engageable with a projection or cam surface on the periphery of switch actuator 20. As a result of this engagement when the cam portion of stop member 40 is engaged with the cam surface, switch actuator 20 is prevented from rotating in response to rotation of actuator lever 15 and any movement of actuator lever 15 is taken up by spring 42.

In other words, when lockout lever 30 is in the first position, the cam portion of stop member 40 will engage the cam surface of switch actuator 20 thus preventing rotational movement of switch actuator 20 in response to movement of actuator lever 15. Conversely, only when the cam portion of stop member 40 is disengaged from the cam surface on switch actuator 20 is it possible to actuate switch 41 in response to rotation of switch actuator 20. If the actuator lever 15 is pulled by the operator to its second position while the lockout lever 30 is in the off position, the only functional result will be an extension of the spring 42 since switch actuator 20 is prevented from rotating by stop member 40.

Figure 8:
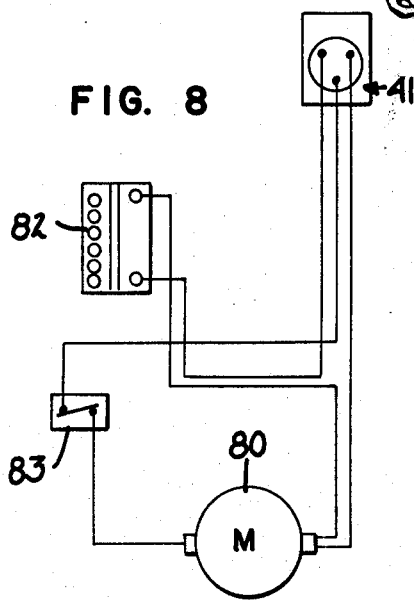
FIG. 8 is an electrical schematic of the circuitry of the present invention.
Figure 7:
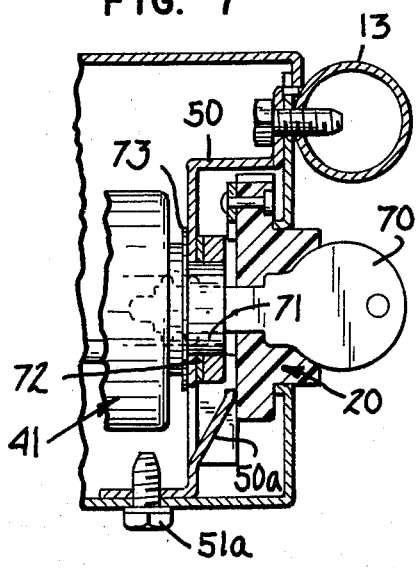
FIG. 7 is a sectional view as seen generally along a line 7—7 of FIG. 6.

As shown schematically in FIG. 8, the general circuitry of the present system is defined by the switch 41, an electric motor 80, a circuit breaker 83, and a battery 82. In one condition the circuit is closed, the system is energized, and the motor is operating. In the opposite condition, the circuit is opened, the system is de-energized, and the motor is stopped by the dynamic braking effect of the back electromotive force.

OPERATION

In operating the mower in a starting sequence, the operator places key 70 into switch actuator 21 and aligns the slot therein with the slot in switch 41. This step can be facilitated by exterior markings on the side of housing 10 indicating proper alignment of switch actuator 20 and switch 41. At this time the operator rotates the lockout lever 30 to the second position. Rotating the lockout lever disengages the cam portion of stop member 40 from the cam surface of switch actuator 20. While lever handle 30 is held in the second position, the operator simultaneously lifts lever actuator 15.

When lever actuator 15 is lifted it causes the attached lever plate 43 to move towards the rear of housing 10 and transfers mechanical movement, through attached spring 42, to rotate switch actuator 20. The cam portion of stop member 40 is, upon rotation, resting on top of the periphery of actuator 20 and will not re-engage the cam surface of the actuator. When switch actuator 20 rotates, key 70 inserted therethrough will likewise rotate, and transfer rotational movement to switch 41 to actuate switch 41, thereby energizing the associated implement.

When actuator lever 15 is released it will return to its first position, releasing tension on spring 42. At this time, the switch actuator 20 will return to its original position by operation of the return spring interior to switch 41 which will reverse rotate the key 70 and transfer this rotation to switch actuator 20.

The cam portion of stop member 40 will then drop from its position above actuator 20 and re-engage cam surface of switch actuator 20. This occurs because lockout lever 30 is spring biased to the second position in which the cam portion of wire stop member 40 will be engaged with the cam surface of switch actuator 20.

If the operator thereafter lifts actuator lever 15 without operating lockout lever 30 to disengage the wire stop member 40 from the switch actuator 20 (by turning the lockout handle to its "on" position), spring 42 will be extended but will not rotate switch actuator 20. Therefore, switch 41 will not be affected. Further, if the operator fails to insert key 70 through switch actuator 20 into switch 41, movement of actuator lever 15 will cause rotation of switch actuator 20 (if the lockout lever 30 is simultaneously disengaged) but this rotation will not be transferred to switch 41 to energize the mower. Therefore, double protection against inadvertent energization is provided.

In summary, the proper starting sequence is as follows: The operator first inserts the key through the switch actuator into the switch. Secondly, the lockout lever must be turned to disengage the cam and the switch actuator. Finally, while the lockout lever is held in the disengaged position, the operator must lift the lever actuator to its second position to energize the system. If the lever actuator is released, for any reason, it will act as a dead man control and automatically brake the circuit and stop the mower. To re-start the mower, the operator must again rotate the lockout lever.

Therefore, it is readily apparent that the present invention provides a substantially improved starting system for electrically powered lawn mowers and the like. It is further apparent that those of skill in the art may make alterations or modifications in light of the teachings of the foregoing specification. Accordingly, it is intended to embrace all such alternatives, modifications and variations as fall within the spirit and broad scope of the appended claims.

What is claimed is:

1. A lawn and garden implement starting system, comprising:
   a. a mechanical actuator responsive to operator control and movable between a first and second position in response thereto;
   b. a switch actuator operably engaged with said mechanical actuator and responsive to movement thereof to rotate a first and second position;
   c. switch means actuatable by rotation of a portion thereof between a first and second position for opening and closing a starting circuit for said implement;
   d. means for mechanically transferring rotational movement of said switch actuator to said switch means, and
   e. lockout means, responsive to operator control, being movable from a position of engagement with said switch actuator to a position of disengagement for selectively preventing rotational movement of said switch actuator in response to movement of said mechanical actuator.

2. The starting system of claim 1 wherein which said mechanical actuator and said actuator are connected by a spring means, so that when said mechanical actuator is moved from said first position to said second position by an operator, said spring means exerts a force against said switch actuator to rotate said switch actuator from said first position to said second position.

3. The starting system of claim 1 in which said lockout means includes:
   a. a handle;
   b. a stop member, having one end thereof attached to said handle, and an opposite end having a cam portion thereon which is engageable with a cam surface on said switch actuator, and
   c. spring means connected to said stop member biasing said lockout means into a position where said cam portion engages said cam surface.

4. The starting system of claim 1 in which said means for mechanically transferring rotational movement from said switch actuator to said switch comprises a key means insertable through a slot in said switch actuator and into a slot in said switch, said key means being removable from switch actuator and said switch.

5. The starting system of claim 1 in which said mechanical actuator is a dead man lever on said lawn and garden implement which is pivotally attached to said implement and weighted to be gravitationally moved from said second position to said first position upon release of operator pressure.

6. A lawn and garden implement starting system, comprising:
   a. a handle assembly having a first handle;
   A second handle pivotally mounted on said first handle and movable between first and second positions,
   b. a switch housing, mounted on said handle assembly, including
   a switch actuator engaged by said second handle, and rotatable in response to movement thereof;
   switch means for opening and closing an electrical circuit to energize said lawn and garden implement;

removable means for linking said switch actuator and said switch means so that said switch means is rotatable with said switch actuator;

lockout means movable between first and second positions, and engagable with said switch actuator so that when said lockout means is in said first position, said switch actuator is not responsive to motion of said second handle; and means for returning said lockout means to said first position whenever said second handle returns to said first position.

7. The structure of claim 6 wherein said second handle includes a spring means thereon which is engagable with said switch actuator.

8. The structure of claim 6 wherein said switch actuator includes
  a. a generally cylindrical body having: a portion thereof which extends through an opening in the side of said switch housing;
  an elongated slot through said switch actuator from the exterior thereof to the interior, and
  b. a spring keeper on said switch actuator for engagement with said spring means on said second handle.

9. The structure of claim 6 wherein said switch means includes:
  a. an electrical switch being rotationally operable between two positions and having
  b. a slot thereon which is alignable with said slot on said switch actuator to receive a key element inserted therethrough.

10. The structure of claim 6 wherein said removable means for engaging said switch actuator and switch means is a key element insertable through said switch actuator into said switch means.

11. The structure of claim 2 wherein said lockout means includes:
  a. a handle portion extending through an opening in said housing;
  b. an inner bracket portion affixed to said handle and extending to the interior of said housing; and
  c. a stop member held by said inner bracket portion and is releasably engagable with said switch actuator.

12. The structure of claim 6 wherein said means for returning said lockout means to said first position includes:
  a spring, one end of which is attached to said lockout means, and opposite end of which is fastened to said housing.

13. The structure of claim 6, further including a mounting plate fixed within said housing, having an opening therethrough for mounting of said switch means and support of said switch actuator.

* * * * *